(12) United States Patent
Otake

(10) Patent No.: US 8,930,057 B2
(45) Date of Patent: Jan. 6, 2015

(54) DRIVING ASSISTANCE DEVICE

(75) Inventor: Hirotada Otake, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/991,775

(22) PCT Filed: Dec. 8, 2010

(86) PCT No.: PCT/JP2010/072046
§ 371 (c)(1),
(2), (4) Date: Jun. 5, 2013

(87) PCT Pub. No.: WO2012/077204
PCT Pub. Date: Jun. 14, 2012

(65) Prior Publication Data
US 2013/0253750 A1 Sep. 26, 2013

(51) Int. Cl.
*B60W 20/00* (2006.01)
*B60W 10/18* (2012.01)
*B60W 10/06* (2006.01)
*G08G 1/0967* (2006.01)

(52) U.S. Cl.
CPC .............. *B60W 20/00* (2013.01); *B60W 10/06* (2013.01); *G08G 1/096725* (2013.01); *G08G 1/096741* (2013.01); *G08G 1/096783* (2013.01); *B60W 10/18* (2013.01); *Y10S 903/93* (2013.01)
USPC ........................................... 701/22; 903/930

(58) Field of Classification Search
CPC ...... B60W 20/00; B60W 10/06; B60W 10/18
See application file for complete search history.

(56) References Cited

U.S. PATENT DOCUMENTS

| | | | |
|---|---|---|---|
| 2003/0184156 A1* | 10/2003 | Hilbert | 303/152 |
| 2008/0059036 A1 | 3/2008 | Imai et al. | |
| 2008/0125934 A1* | 5/2008 | Chen et al. | 701/36 |
| 2009/0265070 A1 | 10/2009 | Okada et al. | |
| 2011/0010068 A1 | 1/2011 | Imai et al. | |
| 2011/0118939 A1 | 5/2011 | Kawamata et al. | |

FOREIGN PATENT DOCUMENTS

| | | |
|---|---|---|
| JP | 2000 305603 | 11/2000 |
| JP | 2001 347852 | 12/2001 |
| JP | 2002 160598 | 6/2002 |
| JP | 2002 373396 | 12/2002 |
| JP | 2005 147713 | 6/2005 |
| JP | 2006 195641 | 7/2006 |
| JP | 2007 38903 | 2/2007 |
| JP | 2008 12975 | 1/2008 |
| JP | 2009 157617 | 7/2009 |
| JP | 2010 951 | 1/2010 |
| WO | 2007 132858 | 11/2007 |

OTHER PUBLICATIONS

International Search Report Issued Mar. 15, 2011 in PCT/JP10/072046 Filed Dec. 8, 2010.

* cited by examiner

*Primary Examiner* — John R Olszewski
*Assistant Examiner* — Jason Roberson
(74) *Attorney, Agent, or Firm* — Oblon, Spivak, McClelland, Maier & Neustadt, L.L.P.

(57) ABSTRACT

A driving assistance device capable of increasing fuel economy by setting a driving assistance unit that is appropriate for running environment information of a vehicle, is provided with a first reliability assessment device, a second reliability assessment device, and a third reliability assessment device, to assess the reliability of the running environment information. The driving assistance device is provided with an HMI control unit, a drive force control amount calculation unit, and non-drive force control amount calculation unit, to select a driving assistance unit on the basis of fuel economy among driving assistance units that can be set, in accordance with the assessed reliability of the running environment information. The driving assistance device sets a driving assistance unit that is appropriate for the running environment information, and assists the driving of the vehicle on the basis of the set driving assistance unit.

13 Claims, 8 Drawing Sheets

Fig.2

| Information source | | | Reliability |
|---|---|---|---|
| ITS control device | | | High |
| DSS control device | | | High |
| NAVI control device | GPS accuracy | High | High |
| | | Middle | Middle |
| | | Low | Low |
| | Number of times of Learning | 5 or more | High |
| | | 3 to 5 | Middle |
| | | 0 to 2 | Low |

Fig.3

| Driving assistance means | | Influence | Requirement |
|---|---|---|---|
| Display/sound device system | HMI (meter) ⋮ ⋮ | a feeling of strangeness : High | Reliability : High |
| Drive system | Engine braking variable control ⋮ ⋮ | a feeling of strangeness : Middle | Reliability : Middle |
| Non-drive system | Engine stop control ⋮ ⋮ | a feeling of strangeness : Low | Reliability : Low |

Fig.4

| Reliability | HMI (feeling of strangeness: High) | Engine braking variable control (feeling of strangeness: Middle) | Engine stop control (feeling of strangeness: Low) |
|---|---|---|---|
| Low | × | × | ○ |
| Middle | × | ○ | ○ |
| High | ○ | ○ | ○ |

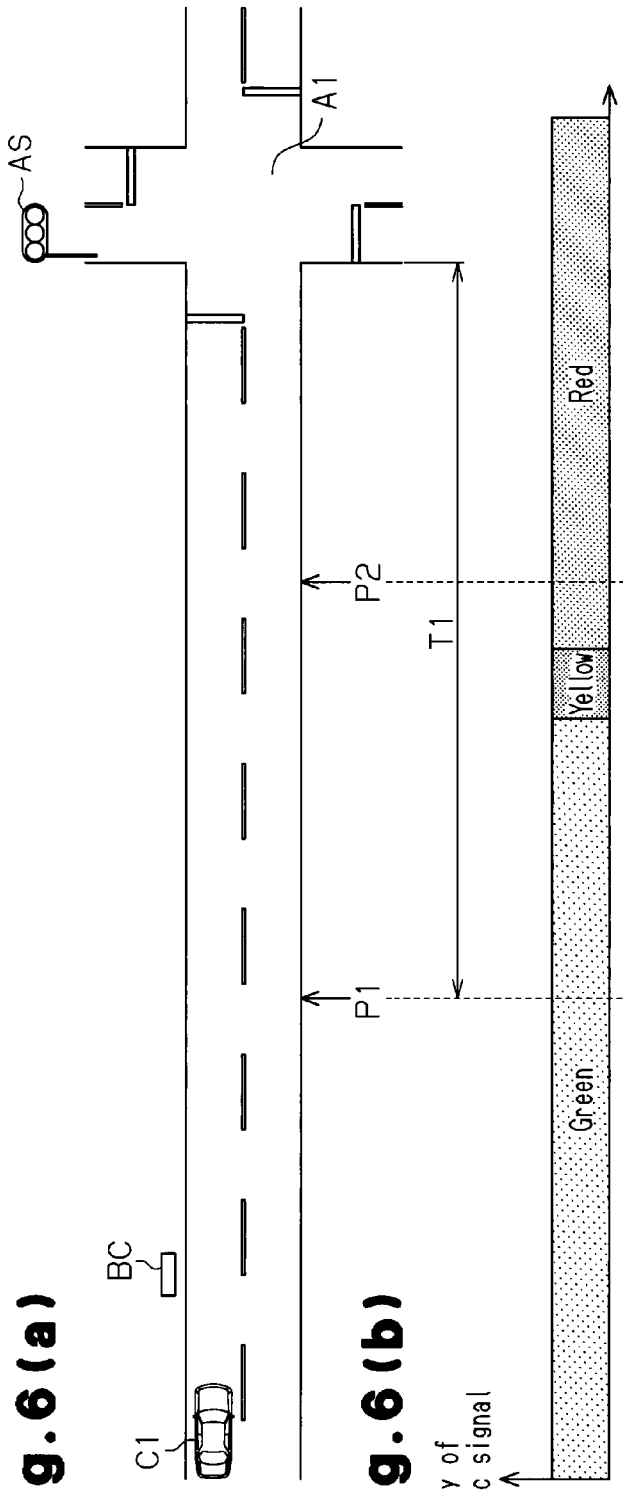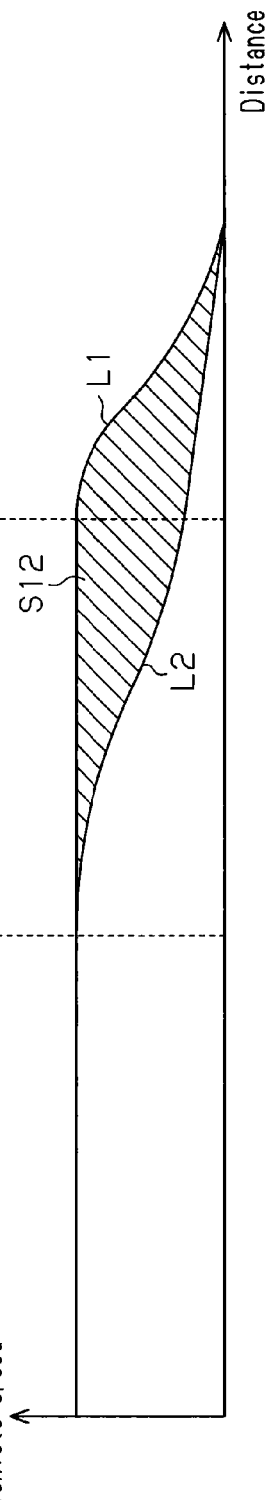

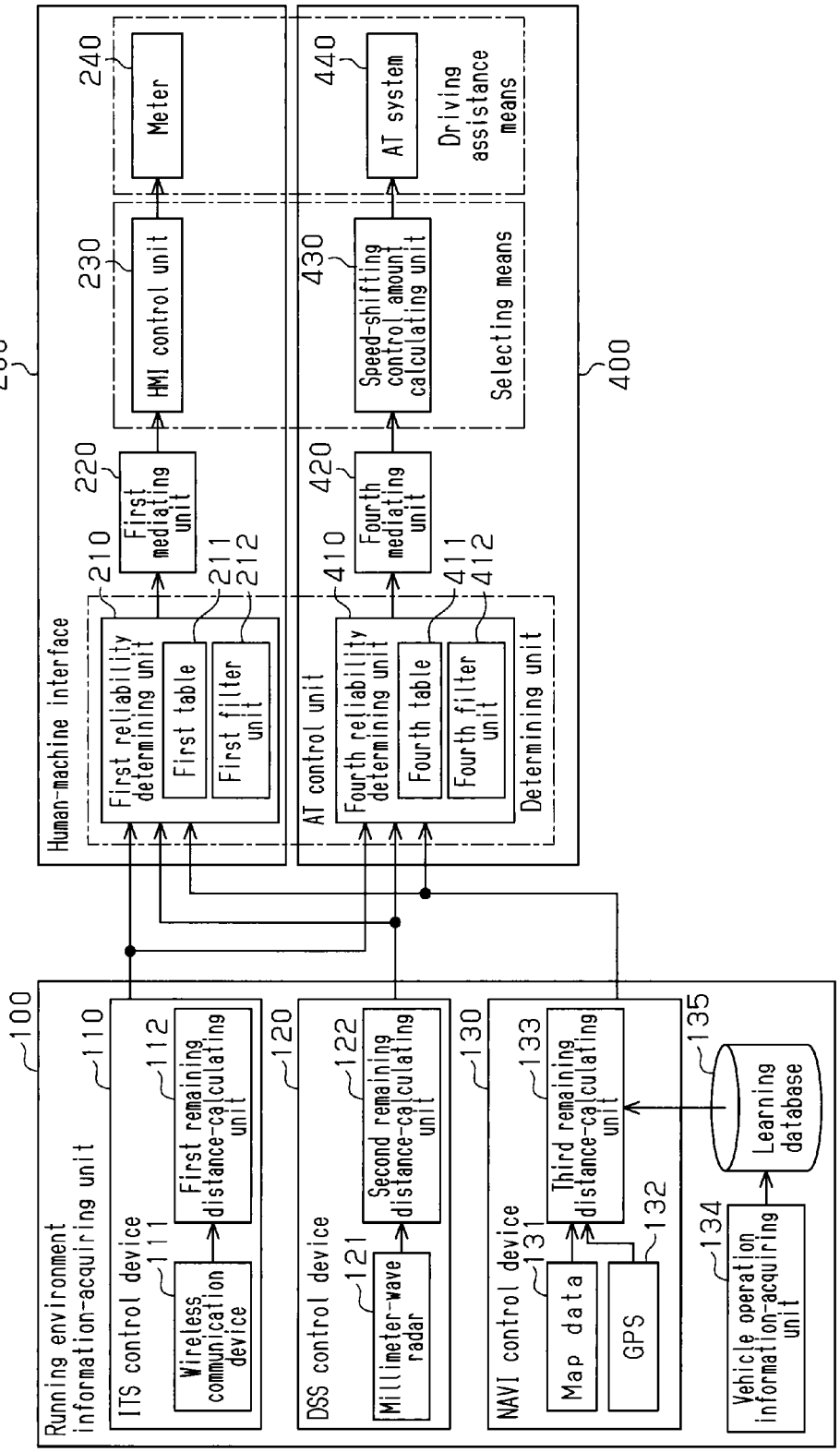

Fig.8

| Reliability | HMI | Speed-shifting control |
|---|---|---|
| Low | × | × |
| Middle | × | ○ |
| High | ○ | ○ |

DRIVING ASSISTANCE DEVICE

FIELD OF THE INVENTION

The present invention relates to a driving assistance device, and more particularly, to a beneficial driving assistance device employed for deceleration assistance and the like of a vehicle.

BACKGROUND OF THE DISCLOSURE

In recent years, highly computerized vehicles have been provided with driving assistance devices for assisting the driving such as a VSC (vehicle stability control) system and an ACC (adaptive cruise control) system. Such driving assistance devices detect a running state of the vehicle based on detection results of various sensors such as a yaw rate sensor and a wheel speed sensor, and determine a control scale of an actuator that is a drive source of the drive train of the vehicle based on the detection results. Based on the determined control scale, the magnitude of engine braking is controlled, a brake force of the brake is controlled or an assist force applied to the steering wheel is controlled, and the drive train of the vehicle is controlled. According to this, the safety of the operation of the vehicle is improved, and fuel economy is improved through economical driving assistance.

To reliably assist driving, high reliability is required for the control scale of the actuator, a reference value for determining the control scale, in other words, detection values of the sensors. Hence, the reliability for the control scale is ensured by making a control device for calculating the control scale into a duplexed system, or by calculating the control scale by a plurality of mutually different processing operations as shown in Patent Document 1. A device described in Patent Document 1 includes main control means provided with "second processing means". The second processing means calculates the control scale based on detection results of various sensors that detect a running state of a vehicle, and a driving state of an actuator is controlled based on the control scale obtained by the main control means. This device includes, in addition to the main control means, "first processing means", which takes in at least one detection result of the various sensors and calculates the control scale through simple processing, which is different from the main control means. Total two control scales calculated by the first and second processing means are compared with each other, and if the comparison results are different from each other, it is determined that the reliability of the control scales is low, and operation of the actuator conducted by the main control means is inhibited.

A device described in Patent Document 2 determines the reliability of running environment information of a vehicle detected by various sensors, and driving modes are switched between automatic driving and manual driving in accordance with the reliability.

PRIOR ART DOCUMENT

Patent Document

Patent Document 1: Japanese Laid-Open Patent Publication No. 2000-305603
Patent Document 2: Japanese Laid-Open Patent Publication No. 2010-951

SUMMARY OF THE INVENTION

Problems that the Invention is to Solve

According to the driving assistance device including the device described in Patent Document 1, if it is determined that the reliability of the control scale and the detection results of various sensors is low, driving control of the actuator based on the control scale, in other words, driving assistance is generally inhibited without any exception. That is, a control structure of the driving assistance device is constructed based on the idea that the driving assistance device undertakes an auxiliary role for a vehicle operation of a driver and a driver has a main responsibility of the vehicle operation. Hence, when it is estimated that the reliability of detection results of various sensors and a calculation result of the control scale is low, inoperative phenomenon of the driving assistance device is normally allowed.

There are many kinds of driving assistance modes for drivers, and driving assistance that is allowed to be executed even when it is determined that the reliability is low can exist from a viewpoint of fuel economy, and driving assistance that should be executed only when the reliability is high also exists of course. Hence, when it is determined that the reliability of detection results of various sensors and the reliability of the calculated control amount are low, if driving control of actuators of the driving assistance device, i.e., the driving assistance for a driver is inhibited uniformly, it is not always true that economical effective driving assistance is implemented.

According to the invention described in Patent Document 2, automatic driving as driving assistance is intended, and the automatic driving is merely switched to the manual driving based on the condition that it is determined that the reliability of running environment information obtained by the various sensors is low. Hence, even if the switching control of the driving assistance is carried out, economical driving assistance is not always conducted. Further, since the driving mode is switched to manual driving when it is determined that the reliability of the running environment information is low, the driving assistance conducted by the driving assistance device is inhibited eventually.

Accordingly, it is an object of the invention to provide a driving assistance device capable of improving fuel economy through setting of a driving assistance means suitable for the running environment information of a vehicle.

Means for Solving the Problems

To achieve the foregoing objective and in accordance with one aspect of the present invention, a driving assistance device is provided, which acquires running environment information of a vehicle, sets one or more driving assistance means suitable for the running environment information, and assists a driving operation of the vehicle by combining the set one or more driving assistance means. The driving assistance device includes determining means, which determines reliability of the acquired running environment information, and selecting means, which selects one of the settable driving assistance means based on fuel economy in accordance with the determined reliability of the running environment information.

Usually, the higher the reliability of running environment information used as a control reference value for driving assistance is, the higher the probability that driving assistance executed based on the information is in harmony with an actual running environment is. Also, the lower the reliability of the running environment information is, the lower the probability that driving assistance executed based on the information is in harmony with the actual running environment is. Even if the frequency of execution of driving assistance suitable for the running environment is reduced due to reduction in the reliability of the running environment information, it is expected that average fuel economy is eventually improved depending upon the actual running environment and contents of driving assistance.

Hence, according to the above configuration, since the driving assistance means is selected as necessary in accordance with the reliability of the running environment information, no matter whether the reliability of the running environment information is high or low, the driving assistance means is set while taking the fuel economy into consideration in light of the reliability of the running environment information. Hence, even if the reliability of the running environment information is low, driving assistance corresponding to the reliability is executed, and it is possible to assist the driving while improving the fuel economy.

Depending upon driving assistance, there is driving assistance that is easily perceived by a driver, in other words, driving assistance that exerts great influence on the running state or the driver of the vehicle, and there is driving assistance that is not easily perceived by a driver, in other words driving assistance that exerts small influence on a running state or a driver of the vehicle. Driving assistance that is more easily perceived by a driver has a greater influence. Therefore, high reliability is especially required for running environment information that is used as a reference of driving assistance. Concerning this point also, according to this configuration, the driving assistance means capable of improving the fuel economy is selected in accordance with the reliability of the running environment information, and a possibility that a driver perceives that a feeling of strangeness is suppressed to the minimum is high. Hence, even if it is determined that the reliability of the running environment information is low, it is possible to carry out economical driving assistance within a range that is not easily perceived by a driver and as a result, it is possible to improve the fuel economy without giving a feeling of strangeness to the driver. According to this, it is possible to improve the fuel economy through setting of the driving assistance means that is suitable for running environment information of a vehicle while suppressing, to the minimum, a feeling of strangeness of a driver with respect to driving assistance.

A control amount controlled by the driving assistance means including a device that assists the driving of a vehicle, for example, a control amount of braking and a control amount of engine output can be assisted through a single actuator or a meter (display of measured value) and the like, but when the driving assistance means in which the actuator and the meter and the like are combined is set, more detailed and more flexible driving assistance is implemented. According to this configuration, in any of these cases, it is possible to select and combine driving assistance means which can improve fuel economy in accordance with the reliability of the determined running environment information.

In accordance with one aspect of the present invention, the selecting means selects one or more driving assistance means capable of achieving the highest fuel economy at the time as driving assistance means to be combined.

According to this configuration, whenever the driving assistance means is selected, one or more driving assistance means capable of achieving the highest fuel economy at the time are selected. By combining the selected driving assistance means, realization of the highest fuel economy at the time is promoted, and extremely economical driving assistance is carried out as the driving assistance.

In accordance with one aspect of the present invention, the driving assistance is deceleration assistance up to a stop position of the vehicle. The determining means determines the reliability of the acquired running environment information as reliability of information concerning a distance up to a deceleration/stop position of the vehicle. As the determined reliability of the running environment information becomes lower, the selecting means selects driving assistance means causing smaller variation in vehicle behavior.

According to this configuration, the reliability of the running environment information is determined as the reliability of information concerning deceleration and stop positions of a vehicle, for example, the distance to a curve of a road or a crossroad. As the reliability of the running environment information is lower, a driving assistance means having smaller vehicle behavior, in other words, a driving assistance means that is not easily perceived by a driver whose driving is to be assisted is selected. Hence, in a hybrid automobile for example, if the reliability of the running environment information is lowered, a driving assistance means that switches power sources of the automobile from an engine to a motor is selected. In an automatic transmission automobile on the other hand, if the reliability of the running environment information is lowered, a driving assistance means is selected that frequently uses a fuel cut-off region utilizing a relatively high gear ratio without normally downshifting when accelerator is released. According to the driving assistance means selected in this manner also, it is possible to ensure economical driving assistance. According to this configuration, even if the reliability of the running environment information is lowered, economical driving assistance is continued within a range in which the driving assistance is not easily perceived by the driver.

In accordance with one aspect of the present invention, the determining means determines the reliability of the acquired running environment information and classifies the reliability into three stages, i.e., "high," "middle," and "low." When the determined reliability is "high," the selecting means executes, as the driving assistance, driving assistance by outputting an image or sound through a display device or a sound device mounted in the vehicle. When the determined reliability is "middle," the selecting means executes, as the driving assistance, driving assistance through driving force control, which is dynamic control of a drive train of the vehicle. When the determined reliability is "low," the selecting means executes, as the driving assistance, driving assistance through non-driving force control, which is static control of the drive train or a non-drive train of the vehicle.

Normally, driving assistance such as image guidance through a display device and sound guidance through a sound device have especially large influence on the driver because assisting is directly conducted visually and auditorily for the driver. Hence, especially high reliability is required for running environment information used for driving assistance by means of image guidance and sound guidance. Like application of a brake force caused by variably controlling engine braking, driving assistance conducted through control of a driving force, which is dynamic control of a drive train of a vehicle, is easily perceived by a driver because vehicle behavior is increased. Therefore, a certain level of reliability is required for the running environment information. On the other hand, like engine stopping control for controlling a manner in which an engine is stopped in a hybrid automobile for example, driving assistance through non-driving force control as static control, which does not apply a brake force to a drive train of a vehicle, is not easily perceived by a driver. Therefore, it is only necessary that minimum reliability is ensured for the running environment information. Static control of a non-drive train of a vehicle to change a target charge amount (SOC: State of charge) of a battery provided in a hybrid automobile for example is also not easily perceived by a driver. Hence, according to this configuration, driving assistance which is easily perceived by a driver and driving assistance and the like which are not easily perceived by a driver are previously determined based on an empirical principle, and driving assistance using running environment information having reliability corresponding to the determined driving assistance items is carried out. Hence, it is possible to reliably and easily select driving assistance suitable for the running environment information.

In accordance with one aspect of the present invention, as the determined reliability of running environment information becomes higher, the selecting means selects a greater number of simultaneously employed driving assistance means that are combined.

Normally, the greater the number of driving assistance means, the greater the influence on a vehicle operation becomes and the stronger a driver's perception with respect to the driving assistance becomes. It is therefore possible to effectively improve the fuel economy. According to this configuration, the number of times of the use of the driving assistance means increases or decreases in accordance with the reliability of the running environment information. Hence, it is possible to easily select a driving assistance means in accordance with the reliability of a running environment degree, and improvement of the fuel economy is promoted.

In accordance with one aspect of the present invention, the vehicle is a hybrid vehicle. The running environment information includes information of a distance estimated until the vehicle stops after the deceleration assistance is started, which distance information is calculated from: information concerning a display switching cycle of a traffic signal acquired by an intelligent transport system (ITS) and concerning a distance to the traffic signal; information concerning a position of a vehicle in front acquired from a millimeter-wave radar system; and information concerning a distance to a deceleration/stop position acquired from a navigation system. The driving assistance means includes a human-machine interface (HMI), which induces an accelerator-releasing operation by display of a meter, deceleration control conducted by a hybrid control unit when the accelerator is released, and engine stop control conducted by the hybrid control unit before the accelerator is released. On condition that the information concerning the display switching cycle of the traffic signal and concerning the distance to the traffic signal have been acquired from the intelligent transport system (ITS) or that the information concerning the position of the vehicle in front has been acquired from the millimeter-wave radar system, the determining means determines the reliability of the running environment information as "high," and with respect to information concerning the distance to the deceleration/stop position acquired from the navigation system, the determining means repeatedly executes a learning operation of the information, and as the number of times of is increased, the determining means changes the determination of the reliability of the running environment information from "low," to "middle," to "high" sequentially. When the determined reliability of the running environment information is determined as "low," the selecting means executes, among the driving assistance means, driving assistance of only engine stop control conducted by the hybrid control unit before the accelerator is released. When the determined reliability of the running environment information is determined as "middle," the selecting means executes driving assistance including deceleration control conducted by the hybrid control unit when the accelerator is released among the driving assistance means. When the determined reliability of the running environment information is determined as "high," the selecting means executes driving assistance further including the human-machine interface (HMI) inducing the accelerator-releasing operation by the meter display among the driving assistance means.

According to this configuration, a plurality of driving assistance means including engine stop control conducted by a hybrid control unit before the accelerator is released, deceleration control conducted by the hybrid control unit when accelerator is released, and a human-machine interface are combined with each other in a stepwise fashion as the reliability of the running environment information is improved. According to this, even if the reliability of the running environment information is varied, driving assistance means suitable for the reliability at the time is selected as necessary, and it is possible to easily set a driving assistance means suitable for the reliability of the running environment information.

In accordance with one aspect of the present invention, concerning deceleration control conducted by the hybrid control unit when the accelerator is released when the reliability of running environment information determined by the determining means is "middle," a control amount of the deceleration control is varied in accordance with the number of times of the learning within a range in which the reliability is determined as "middle."

There is a tendency that a driver's vehicle operation with respect to traffic elements such as intersections and curves of roads follows a certain pattern, and it is possible to empirically obtain, through learning of the vehicle operation, the distance from a certain traffic element to a start of a driver's deceleration operation. The greater the number of times of learning, the higher reliability with respect to the learned information naturally becomes. Therefore, it is possible to set a driving assisting mode with respect to a driver in accordance with the reliability. That is, according to this configuration, in a hybrid automobile for example, the greater the number of times of the learning, the greater the regeneration amount caused by regeneration brake increases. When the number of times of the learning is small, the regeneration amount caused by the regeneration brake is set small. According to this, a control amount suitable for the number of times of learning of a driver's vehicle operation is set, and within a range in which the reliability of the running environment information is determined as "middle", more detailed driving assistance is carried out.

In accordance with one aspect of the present invention, the driving assistance device further includes a mediating unit. The mediating unit mediates, as a distance through which driving assistance is carried out, shortest one of a plurality of distances to a deceleration/stop position of the vehicle when the level of the reliability of the running environment information by the determining means is the same.

According to this configuration, when it is determined that the reliability of running environment information is the same, the shortest distance in a plurality of distance information sets indicated by the running environment is mediated as a distance through which driving assistance is carried out. That is, in a case in which, as a distance from device-mounting vehicle to a traffic signal as a deceleration spot, "50 m" is indicated in information acquired from an intelligent transport system, which is evaluated as having high degree of reliability, and "30 m" is indicated in information acquired from a millimeter-wave radar system, which is evaluated as having high degree of reliability, the distance from device-mounting vehicle to a traffic signal as a deceleration spot is mediated as "30 m". Driving assistance for a driver is executed based on the information indicative of this mediated distance. According to this, even if information sets of a distance indicated in running environment information sets that are regarded as having the same reliability are different from each other, it is possible to uniformly select information of a distance which should be a reference when driving assistance is carried out through mediation of information. When the mediation is carried out, information of the shortest distance among information sets of a plurality of distances is mediated. According to this, when deceleration assistance is carried out, deceleration assistance can be conducted while ensuring a sufficient distance from a deceleration target (deceleration/stop spot), and safety of a vehicle operation is improved.

In accordance with one aspect of the present invention, the determining means is provided in each of communication paths through which the running environment information is transmitted between the driving assistance means and a system that acquires the running environment information. The determining means has a filtering function that allows passage of running environment information determined as having reliability satisfying a reliability criterion that is set for the corresponding driving assistance means, and inhibits transmission of running environment information that is determined as having reliability lower than the reliability criterion.

According to this configuration, determining means having filtering functions are arranged in the middle of a communication path through which running environment information is transmitted. As a result, only running environment information matching with reliability that is previously prescribed in the driving assistance means is input to each of the driving assistance means. Hence, it is only necessary that each of the driving assistance means execute driving assistance based on running environment information that is input through the determining means, and it is unnecessary for the driving assistance means to determine the reliability of the running environment information. According to this, it is possible to smoothly set a driving assistance means that is suitable for the reliability of running environment information.

In accordance with one aspect of the present invention, the communication path through which the running environment information is transmitted between the driving assistance means and a system that acquires the running environment information is unified in the determining means. The determining means selectively sends, to corresponding one of the driving assistance means, running environment information determined as having reliability satisfying a reliability criterion prescribed in the corresponding driving assistance means.

According to this configuration, a determining means that selectively sends the running environment information according to the reliability specified in the driving assistance means is provided in the middle of the communication path through which the running environment information is transmitted. As a result, only running environment information matching with reliability that is previously prescribed in the driving assistance means is input to each of the driving assistance means. Hence, it is only necessary that each of the driving assistance means execute driving assistance based on running environment information that is input through the determining means, and it is unnecessary for the driving assistance means to determine the reliability of the running environment information. According to this, it is possible to smoothly set a driving assistance means that is suitable for the reliability. According to this configuration, it is only necessary that one determining means is provided in a path where the communication paths are unified, and it is possible to realize setting of the driving assistance means by a simpler configuration.

In accordance with one aspect of the present invention, the determining means determines the reliability by referring to a table in which reliability sets are registered with respect to information sets concerning a distance to the deceleration/stop position of the vehicle acquired from each of the systems as the running environment information sets.

Normally, characteristics of a system that is an acquiring source of running environment information is reflected to the reliability of the information, and if the acquiring source of the running environment information is identified, it is possible to uniformly determine the reliability of the running environment information. Hence, according to this configuration, it is possible to easily determine the reliability of the running environment information acquired from each system with reference to the table.

In accordance with one aspect of the present invention, the driving assistance is carried out as application of a brake force to the drive train of the vehicle. The selecting means selects the driving assistance means such that the higher the reliability, the greater a control amount for determining the brake force becomes.

According to this configuration, as the reliability of the determined running environment information is improved, the brake force is increased, and influence of driving assistance is increased. That is, the higher the reliability of the running environment information, the more economical the executed driving assistance becomes. According to this, it is possible to carry out driving assistance suitable for the reliability of the running environment information utilizing a drive train of a vehicle.

BRIEF DESCRIPTION OF THE DRAWINGS

FIG. 2 is a diagram showing one example of the reliability of running environment information corresponding to an acquiring source of the running environment information;

FIG. 3 is a diagram showing one example of a relationship between influence on a driver of each driving assistance means and required reliability;

FIG. 4 is a diagram showing setting of the driving assistance means of the embodiment;

FIG. 6(*a*) is a diagram showing one example of a relationship between a vehicle that is to be drive-assisted and a running environment of the vehicle;

FIG. 6(*b*) is a time chart showing one example of a signal cycle of a traffic signal;

FIG. 6(*c*) is a time chart showing one example of speed changes of a vehicle that is to be drive-assisted;

FIG. 7 is a schematic block diagram of a second embodiment of the driving assistance device of the invention;

FIG. 8 is a diagram showing a setting example of the driving assistance means of the second embodiment;

DETAILED DESCRIPTION OF THE PREFERRED EMBODIMENTS

First Embodiment

A driving assistance device according to a first embodiment of the present invention will be described below with reference to FIGS. 1 to 6. The driving assistance device of the present embodiment is provided in a hybrid automobile to carry out driving assistance for the driver of the automobile.

Figure 1:
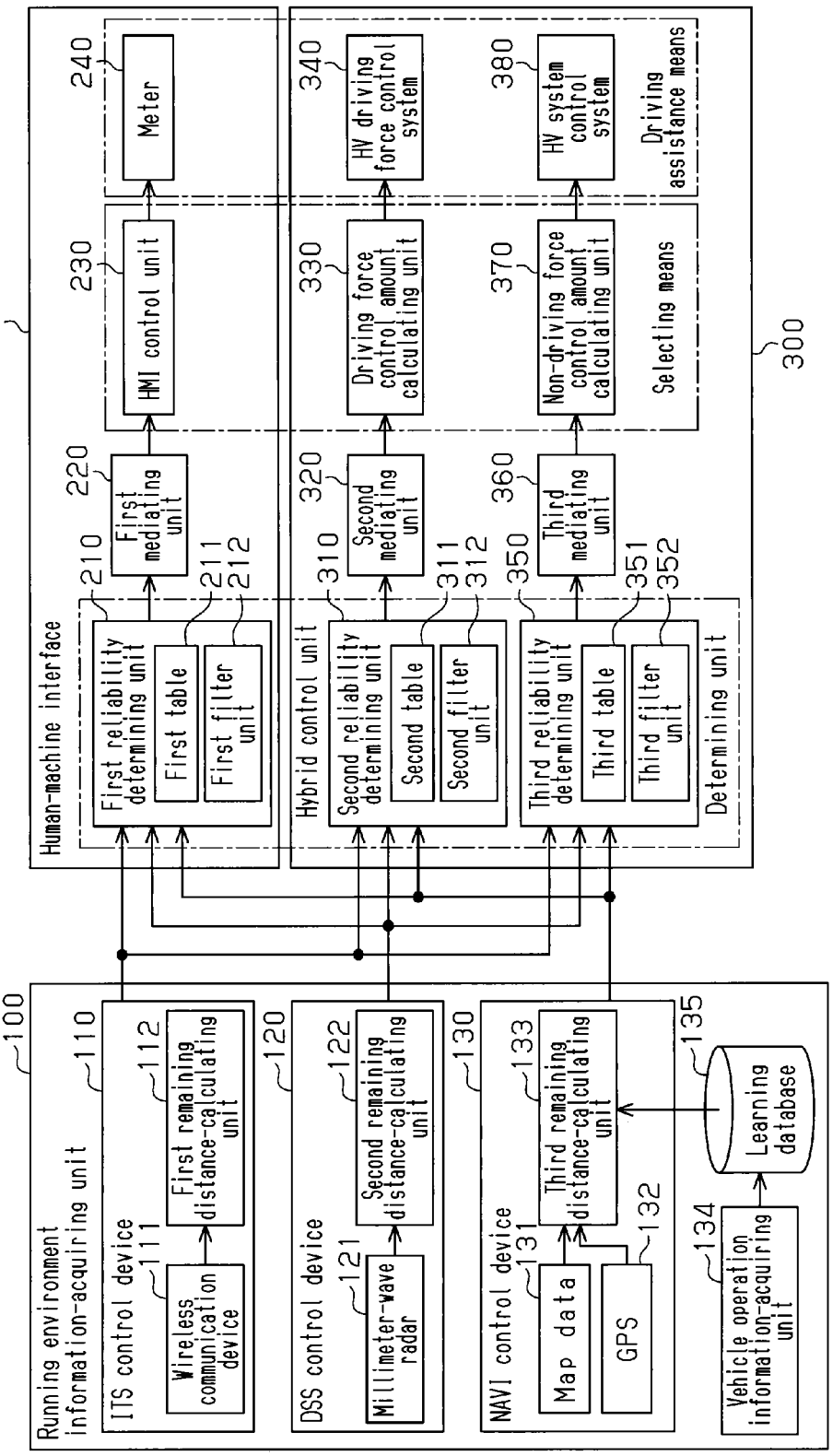
FIG. 1 is a schematic block diagram of a first embodiment of a driving assistance device according to the present invention.

As shown in FIG. 1, the driving assistance device of the present embodiment includes a running environment information-acquiring unit 100 for acquiring running environment information of device-mounting vehicle. The driving assistance device of the present embodiment includes a human-machine interface (HMI) 200 for inducing a driver to release the accelerator by displaying a meter provided in device-mounting vehicle, and a hybrid control unit 300 for controlling a hybrid system of the device-mounting vehicle.

The running environment information-acquiring unit 100 includes an ITS control device 110 configuring an intelligent transport system (ITS). The ITS control device 110 includes a wireless communication device 111, which communicates with optical beacon antennas provided on roads by light signals such as infrared ray. Although not illustrated in the drawing, the optical beacon antenna is installed at a position separated by several hundred meters from an intersection where a traffic signal is provided. The optical beacon antenna sends, as an infrastructure information signal, information such as road alignments, the distance to an intersection and a signal cycle of a traffic signal provided at an intersection. The wireless communication device 111 receives the infrastructure information signal sent from the optical beacon antenna, and sends the received signal to a first remaining distance-calculating unit 112. The first remaining distance-calculating unit 112 calculates the distance to a deceleration/stop position of the device-mounting vehicle. The infrastructure information signal includes accompanying information associated with a road such as a road status (including intersection shape, curvature, gradient, number of lanes) of a road where the optical beacon antenna is provided, and moving body information of other vehicles existing around an intersection detected by ground facilities and the like.

The wireless communication device 111 receives road traffic information delivered from a VICS (Vehicle Information and Communication System: registered trademark) center through the optical beacon antenna. The road traffic information includes traffic jam information such as a traffic jam interval and a degree of traffic jam, and traffic regulation information such as closed to vehicular traffic. The wireless communication device 111 also sends road traffic information received from the VICS center to the first remaining distance-calculating unit 112.

The first remaining distance-calculating unit 112 calculates the distance between the device-mounting vehicle and a curve, an intersection, a temporary stop position and the like existing in front in a travelling direction of the device-mounting vehicle for example based on an infrastructure information signal and road traffic information received from the wireless communication device 111. The first remaining distance-calculating unit 112 sends information concerning the calculated distance and information concerning a signal cycle included in the infrastructure information signal to the HMI 200 and the hybrid control unit 300 as running environment information of the device-mounting vehicle.

The running environment information-acquiring unit 100 includes a DSS control device 120 as a control device of a driver support system (DSS). The DSS control device 120 is made up of a millimeter-wave radar 121 and a second remaining distance-calculating unit 122 having a function corresponding to the first remaining distance-calculating unit 112. The millimeter-wave radar 121 has a distance-measuring function for measuring the distance to an object such as an automobile existing in front of the millimeter-wave radar 121, and a speed-measuring function for measuring a speed (relative speed) of the millimeter-wave radar 121 itself with respect to the object. The millimeter-wave radar 121 sends, as necessary, a measurement result measured by the millimeter-wave radar 121 to the second remaining distance-calculating unit 122.

The second remaining distance-calculating unit 122 calculates the distance between the device-mounting vehicle and another vehicle in front in the travelling direction based on the measurement result received from the millimeter-wave radar 121, and sends, as necessary, the information concerning the calculated distance to the HMI 200 and the hybrid control unit 300 as running environment information of the device-mounting vehicle.

In this embodiment, the DSS control device 120 corresponds to the millimeter-wave radar system.

The running environment information-acquiring unit 100 includes a NAVI control device 130 as a control device for controlling a car navigation system provided in the device-mounting vehicle. The NAVI control device 130 includes a GPS 132 and map data 131 corresponding to a driving region of the vehicle. The NAVI control device 130 includes a third remaining distance-calculating unit 133 having functions respectively corresponding to the first remaining distance-calculating unit 112 and the second remaining distance-calculating unit 122.

The map data 131 is information concerning a map, and includes map display data and guidance data (name of intersection, name of road, name of direction, direction guide equipment information). The map display data is data for displaying background of a road and a road map. The guidance data includes names of intersections, and is used for informing a driver and the like of a recommended road based on the recommended road. Information concerning the latitude and longitude is registered in the road map data.

The GPS 132 receives a GPS satellite signal for detecting an absolute position of the device-mounting vehicle, detects the latitude and longitude of the device-mounting vehicle based on the received GPS satellite signal, and sends the detected latitude and longitude information of the device-mounting vehicle to the third remaining distance-calculating unit 133.

If the third remaining distance-calculating unit 133 receives the latitude and longitude information of the device-mounting vehicle, the third remaining distance-calculating unit 133 refers to the latitude and longitude information and the map data 131, and acquires information concerning running environment in which the device-mounting vehicle is running. The third remaining distance-calculating unit 133 identifies the absolute position of the device-mounting vehicle from the latitude and longitude information for example, and extracts a traffic element such as a curve and an intersection existing in front in the travelling direction of the device-mounting vehicle. The third remaining distance-calculating unit 133 calculates the distance from the extracted traffic element to the device-mounting vehicle, and sends the calculated result to the HMI 200 and the hybrid control unit 300 as running environment information of the device-mounting vehicle.

The NAVI control device 130 includes a vehicle operation information-acquiring unit 134 for acquiring information (vehicle operation information) concerning a driver's vehicle operation of the device-mounting vehicle. The vehicle operation information-acquiring unit 134 takes in detection results of the various sensors provided in the device-mounting vehicle, and acquires vehicle operation information such as a deceleration operation, a stopping operation and a laterally turning operation based on the detection results. The vehicle operation information-acquiring unit 134 sends the acquired vehicle operation information to a learning database 135.

The learning database 135 learns, as necessary, vehicle operation information sent from the vehicle operation information-acquiring unit 134 together with corresponding position information. By repeatedly executing such a learning operation, a deceleration spot where a deceleration operation is carried out every time, a temporary stop spot where a stopping operation is carried out every time, and a laterally turning spot such as a curve and an intersection where a laterally turning operation is carried out are learned and registered in the learning database 135.

The third remaining distance-calculating unit 133 calculates the distance from the device-mounting vehicle to the deceleration spot or a stop spot also by referring to information that is registered in the learning database 135 as the deceleration spot and the stop spot. The third remaining distance-calculating unit 133 sends the calculation result to the HMI 200 and the hybrid control unit 300 as running environment information of the device-mounting vehicle.

The HMI 200 includes a first reliability determining unit 210 for determining the reliability of running environment information sets that are input from the ITS control device 110, the DSS control device 120 and the NAVI control device 130. The first reliability determining unit 210 is located in a communication path for the running environment information sets. The first reliability determining unit 210 includes a first table 211 in which the reliability of each of the running environment information sets sent from the ITS control device 110, the DSS control device 120 and the NAVI control device 130 is registered.

As exemplified in FIG. 2, when an acquiring source of running environment information is the ITS control device 110 and the DSS control device 120, it is prescribed in the first table 211 that the reliability of the running environment information is high. When an acquiring source of running environment information is the map data 131 and the GPS 132 of the NAVI control device 130, it is prescribed in the first table 211 that the higher the accuracy of the GPS 132 is, the higher the reliability of the running environment information is. Similarly, when an acquiring source of running environment information is the learning database 135 of the NAVI control device 130, it is prescribed in the first table 211 that the greater the number of the number of times of learning information concerning the distance, the higher the reliability of the running environment information becomes. The first reliability determining unit 210 determines the reliability of the running environment information received from the ITS control device 110, the DSS control device 120 and the NAVI control device 130 by referring to the first table 211.

The first reliability determining unit 210 includes a first filter unit 212. The first filter unit 212 selects between passage and inhibition of running environment information sent to the first reliability determining unit 210 based on reliability determined by referring to the first table 211 and reliability criterion, which is previously prescribed in the HMI 200 as a driving assistance means. In this embodiment, the reliability criterion is prescribed based on a principle shown in FIG. 3. That is, as shown in FIG. 3, driving assistance conducted by a display/sound device system is directly conducted for a driver visually and auditorily. Therefore, influence of the driving assistance on the driver is great and thus, vehicle behavior becomes great. Hence, "high" is prescribed as reliability required for running environment information that is used for the driving assistance conducted by the display/sound device system. In the case of driving assistance conducted through driving force control that is dynamic control of a drive train of a vehicle like engine braking, since vehicle behavior becomes great, the driving assistance is easily perceived by a driver, "middle" is prescribed as reliability required for running environment information that is used for the driving assistance conducted through the driving force control. In the case of driving assistance conducted through non-driving force control that is static control that does not apply a brake force to a drive train of a vehicle like engine stop control for controlling a mode in which an engine (gasoline engine) is stopped in a hybrid automobile for example, the driving assistance is not easily perceived by a driver. Therefore, "low" is prescribed as reliability required for running environment information that is used for the driving assistance conducted through the non-driving force control.

Based on the reliability criterion and the determined reliability of running environment information sets, the first filter unit 212 selectively allows passage of the running environment information sets sent from the ITS control device 110, the DSS control device 120 and the NAVI control device 130. As a result, among the running environment information sets received by the first reliability determining unit 210, only running environment information sets determined as having "high" reliability can pass through the first reliability determining unit 210 as information sets that match the reliability criterion in the HMI 200. In this manner, running environment information sets that have passed through the first reliability determining unit 210 are sent to a first mediating unit 220, which mediates the running environment information sets.

From a plurality of distances to a deceleration/stop position of the device-mounting vehicle when degrees of the reliability of a plurality of running environment information sets received from the first reliability determining unit 210 are equal to each other, the first mediating unit 220 mediates, i.e., selects the shortest distance as a distance through which driving assistance is carried out. For example, assume that information concerning the distance from the device-mounting vehicle to a certain intersection sent from the ITS control device 110 is "100 m", information concerning a distance to the same intersection sent from the NAVI control device 130 is "120 m", and they have the same degrees of reliability. At this time, of the two distances "100 m" and "120 m", the shortest distance "100 m" is mediated as a distance through which the driving assistance is carried out. Running environment information that is mediated by the first mediating unit 220 is sent to a HMI control unit 230, which controls a driving assistance mode conducted by the HMI 200.

The HMI control unit 230 conducts deceleration assistance to a stop position for the driver of the device-mounting vehicle by controlling a display mode conducted by a meter (measured value display) 240 as a display device provided in a vehicle interior based on running environment information received from the first mediating unit 220. For example, assume that based on information received from the first mediating unit 220, an intersection provided with a traffic signal exists at a position of "100 m" in front of the running device-mounting vehicle and it is estimated that the traffic signal is turned from green to red when the device-mounting vehicle enters the intersection. When the distance between the device-mounting vehicle and the intersection becomes "80 m", which is preset as a distance required for smoothly and economically stopping, for example, the HMI control unit 230 displays, on the meter 240, an image inducing the driver to release the accelerator. As a result, an image for driving assistance controlled based on running environment information having high reliability is displayed, as necessary, on the meter 240. Only when running environment information determined as having high reliability is acquired by the running environment information-acquiring unit 100, an image for driving assistance is displayed on the meter 240. Hence, when the reliability of running environment information received by the HMI 200 is lowered from "high" to "middle" or to "low", display of an image for driving assistance on the meter 240 is stopped, and driving assistance is changed from image-displayed driving assistance to image-non-displayed driving assistance. When the reliability of running environment information received by the HMI 200 is improved from "middle" or "low" to "high" on the other hand, display of an image for driving assistance on the meter 240 is resumed and driving assistance is changed from image-non-displayed driving assistance to image-displayed driving assistance. According to this, a driving assistance means suitable for running environment information acquired from the running environment information-acquiring unit 100 is set, and safe and economical driving assistance is carried out.

In the hybrid control unit 300, a communication path for the running environment information includes a second reliability determining unit 310 and a second mediating unit 320 having functions corresponding to the first reliability determining unit 210 and the first mediating unit 220. Among them, the second reliability determining unit 310 also includes a second table 311 and a second filter unit 312 corresponding to the first table 211 and the first filter unit 212.

As running environment information that is employed in driving assistance through the driving force control of the device-mounting vehicle, the second filter unit 312 allows running environment information that is determined as having "high" or "middle" reliability to pass based on the above-described reliability criterion shown in FIG. 3, and inhibits passage of running environment information that is determined as having "low" reliability. The running environment information that has passed through the second filter unit 312 is mediated by the second mediating unit 320, and is sent to a driving force control amount calculating unit 330, which calculates a control amount. This control amount determines a driving force of the device-mounting vehicle.

Based on the running environment information, the driving force control amount calculating unit 330 calculates a control amount for carrying out deceleration assistance when the accelerator is released. For example, the driving force control amount calculating unit 330 determines a control amount of regeneration brake control required for carrying out an economical and smooth stopping operation and timing to start the regeneration brake control until the device-mounting vehicle reaches a stop position. In this example, the control amount is determined such that a deceleration of normal engine braking is "0.03 G" but deceleration becomes "0.07 G". This determined control amount is sent to a HV driving force control system 340 which controls the drive train of the device-mounting vehicle, and deceleration assistance suitable for the control amount is carried out.

Only when running environment information determined as having "high" or "middle" reliability is acquired by the running environment information-acquiring unit 100, a control amount from the driving force control amount calculating unit 330 is input to the HV driving force control system 340. Deceleration assistance suitable for the control amount is executed by the driving force control amount calculating unit 330. Hence, when the reliability of running environment information that is input to the second reliability determining unit 310 of the hybrid control unit 300 is lowered from "high" or "middle" to "low", deceleration assistance by the HV driving force control system 340 is not conducted.

When the reliability of running environment information that is input to the second reliability determining unit 310 of the hybrid control unit 300 is improved from "low" or "middle" to "high", deceleration assistance by the HV driving force control system 340 is resumed, and driving assistance including deceleration assistance conducted by the HV driving force control system 340 is newly set.

When the reliability of running environment information that is input to the second reliability determining unit 310 is improved from "low" or "middle" to "high", driving assistance utilizing a plurality of driving assistance means in combination is carried out such that the driving assistance is implemented by the HV driving force control system 340 and the HMI 200 (meter 240). According to this, when it is determined that running environment information is high, more effective driving assistance is carried out, and economical driving assistance is promoted.

In the hybrid control unit 300, a communication path for the running environment information includes a third reliability determining unit 350 and a third mediating unit 360 having functions corresponding to the first reliability determining unit 210 and the first mediating unit 220. Among them, the third reliability determining unit 350 also includes a third table 351 and a third filter unit 352 corresponding to the first table 211 and the first filter unit 212.

As running environment information that is used in driving assistance through the non-driving force control of the device-mounting vehicle, the third filter unit 352 makes running environment information which is determined as having "high", "middle" or "low" reliability pass based on the above-described reliability criterion shown in FIG. 3. Only when it is determined that information indicated by running environment information is obviously an abnormal value, the third filter unit 352 of the present embodiment interrupts running environment information, and allows passage of other running environment information. Running environment information that has passed the third filter unit 352 is mediated by the third mediating unit 360, and the mediated running environment information is sent to a non-driving force control amount calculating unit 370, which calculates a control amount when the non-driving force control is executed.

In this embodiment, the first reliability determining unit 210, the second reliability determining unit 310, and the third reliability determining unit 350 correspond to the determining means.

The non-driving force control amount calculating unit 370 calculates a control amount for conducting engine stop control before the accelerator is released based on the running environment information. For example, to make it possible to conduct a smooth running stop operation until the device-mounting vehicle reaches a stop position, the driving force control amount calculating unit 330 sets, as timing to stop the engine, timing at which the device-mounting vehicle reaches a position separated away from the stop position by "80 m". This determined control amount is sent to a HV system control system 380, which controls a battery for example as a non-drive train of the device-mounting vehicle, and deceleration assistance suitable for the control amount is carried out. In this embodiment, the HMI control unit 230, the driving force control amount calculating unit 330 and the non-driving force control amount calculating unit 370 configure a selecting means that selects a driving assistance means. The meter 240, the HV driving force control system 340 and the HV system control system 380 function as driving assistance means respectively configuring devices (means) that assist a driver's driving operation of a vehicle.

When the reliability of running environment information that is input to the third reliability determining unit 350 is improved from "low" to "middle", combined driving assistance in which a plurality of driving assistance means are combined is implemented by the HV system control system 380 and the HV driving force control system 340. Further, when the reliability of running environment information that is input to the third reliability determining unit 350 is improved from "low" or "middle" to "high", driving assistance utilizing a plurality of driving assistance means such as the HV system control system 380, the HV driving force control system 340 and the HMI 200 (meter 240) in combination is carried out. According to this, in this embodiment, the driving assistance means such as the HMI 200, the HV driving force control system 340 and the HV system control system 380 are combined in accordance with the reliability of running environment information in a mode shown in FIG. 4, and these means are utilized in combination.

In this embodiment, even if running environment information is determined as having "low" or "middle" reliability, driving assistance utilizing the running environment information is executed through the HV driving force control system 340 and the HV system control system 380. Further, according to the driving assistance executed by the HV driving force control system 340 and the HV system control system 380, influence on the driver is lower than that of driving assistance executed by the HMI 200, but the former driving assistance is necessary for achieving the highest fuel economy at the current time. In this embodiment, even if it is difficult to ensure the reliability of running environment information as described above, the driving assistance is executed within a range in which a driver cannot easily perceive the driving assistance. That is, since reliability is low, even if unnecessary deceleration assistance is carried out because erroneous information is included in information indicated by running environment information, if comprehensive driving assistance in a running path from a departure spot to a target spot is taken into account, it is expected that average fuel economy is improved.

Operation of the driving assistance device of the present embodiment will be described with reference to FIG. 5.

Figure 5:
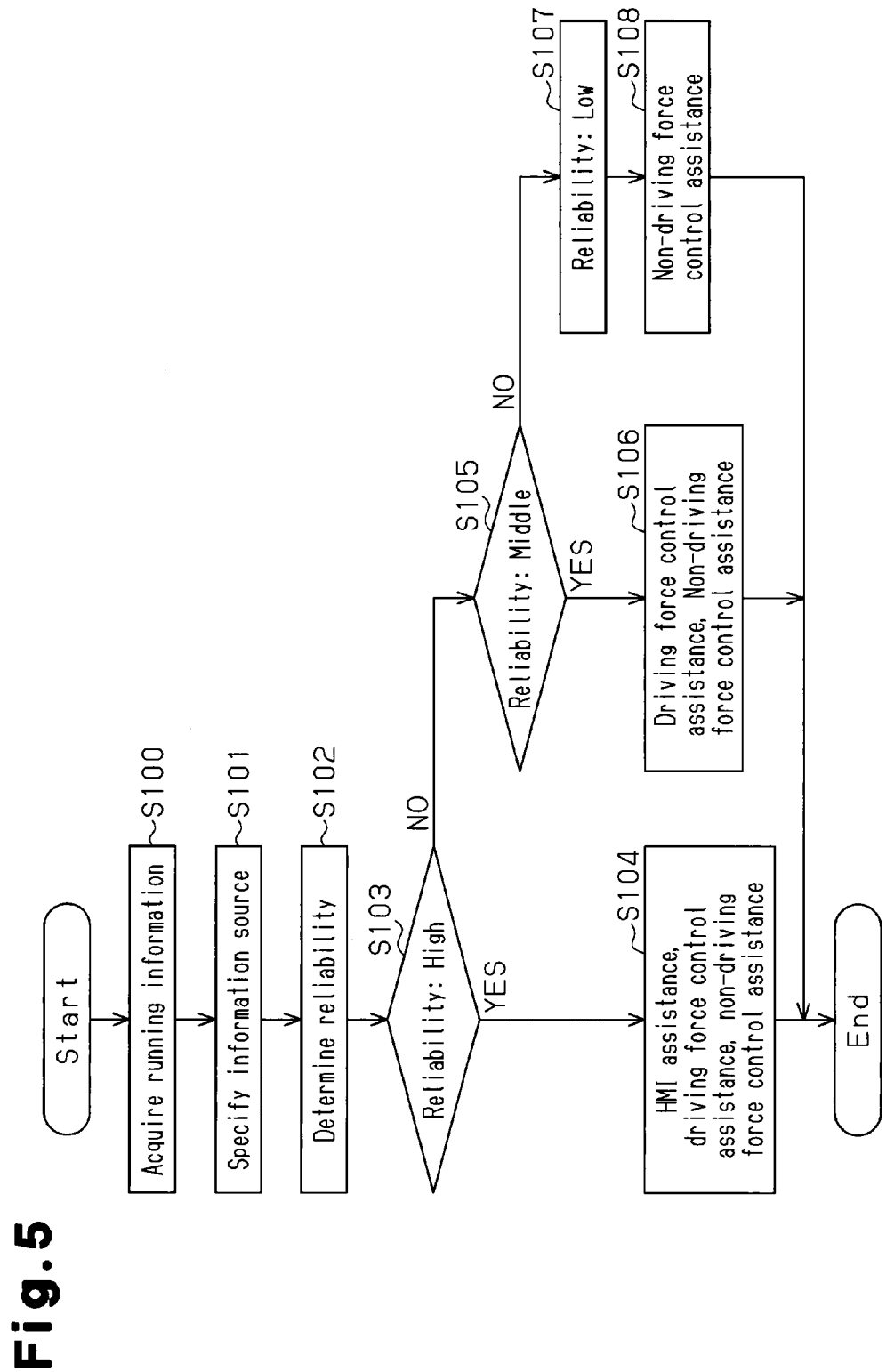
FIG. 5 is a flowchart showing one example of a driving assistance procedure of the embodiment.

As shown in FIG. 5, in step S100 of a driving assistance routine, the running environment information-acquiring unit 100 acquires running environment information of the device-mounting vehicle. It is identified which one of systems of the running environment information-acquiring unit 100 acquires this acquired running environment information (step S101). If an information source of the running environment information is identified in this manner, the reliability of the running environment information is determined by referring to this identified information source and Table shown in FIG. 2 (step S102).

If the determined reliability is "high," the meter 240, the HV driving force control system 340 and the HV system control system 380 are selected as driving assistance means used for driving assistance based on the determined running environment information, and driving assistance in which the selected driving assistance means are combined is executed (step S103: YES, S104).

If the determined reliability is "middle," the HV driving force control system 340 and the HV system control system 380 are selected as driving assistance means used for the driving assistance based on the determined running environment information, and driving assistance in which the selected driving assistance means are combined is executed (step S105: YES, S106).

If the determined reliability is "low," the HV system control system 380 is selected as a driving assistance means used for the driving assistance based on the determined running environment information, and driving assistance in which only the HV system control system 380 is utilized is executed (step S107: YES, S108).

In the next executing cycle of the driving assistance routine, when the reliability of running environment information determined as "low" or "middle" is changed to "high," the meter 240, the HV driving force control system 340 and the HV system control system 380 are selected as driving assistance means to be set next in accordance with the change of the reliability. Further, the reliability of running environment information that is once determined as "high" is changed to "middle," driving assistance utilizing all of the meter 240, the HV driving force control system 340 and the HV system control system 380 is shifted to driving assistance utilizing only the HV driving force control system 340 and the HV system control system 380 in accordance with the change of the reliability. Similarly, when the reliability of running environment information that is once determined as "low" is changed to "middle", driving assistance utilizing only the HV system control system 380 is shifted to driving assistance utilizing the HV driving force control system 340 and the HV system control system 380 in accordance with the change of reliability. Further, when the reliability of running environment information that is once determined as "high" or "middle" is changed to "low", driving assistance utilizing the meter 240, the HV driving force control system 340 and the HV system control system 380 is shifted to driving assistance utilizing only the HV system control system 380 in accordance with the change of reliability.

As described above, according to this embodiment, even if the running environment is changed as the device-mounting vehicle runs and the reliability of the acquired running environment information is changed, the driving assistance is continued in a mode in which the driving assistance means is selected (shifted) as necessary. According to this, driving assistance suitable for the reliability of running environment information at the time is continuously conducted, and economical driving assistance is implemented.

A driving assistance mode conducted by a driving assistance device of this embodiment will be described below with reference to FIG. 6.

As shown in FIG. 6(a), it is assumed that a driver drives a vehicle C1, and the vehicle C1 is running toward an intersection A1 including a traffic signal AS. Information concerning the distance from an optical beacon antenna BC provided by a road to the intersection A1 and information concerning a signal cycle of the traffic signal AS are sent to a wireless communication device 111 provided in the vehicle C1 by the optical beacon antenna BC. Running environment information of the vehicle C1 is acquired also by the DSS control device 120 and the NAVI control device 130.

If the vehicle C1 receives, from the wireless communication device 111, running environment information sent from the optical beacon antenna BC, the vehicle C1 determines the reliability of the received running environment information. Similarly, the vehicle C1 likewise determines the reliability of running environment information of the vehicle C1 acquired by the ITS control device 110 and the NAVI control device 130. As a result, when it is determined that the reliability is high and mediated information is acquired by the wireless communication device 111, a driving assistance means is set based on this running environment information. As shown in FIG. 6(*b*), the first remaining distance-calculating unit 112 identifies the current state of the traffic signal AS when the vehicle C1 reaches the intersection A1. When the vehicle C1 reaches the intersection A1, it is predicted that the traffic signal AS will be turned from green to red.

Assume that as the vehicle C1 runs, the vehicle C1 reaches a spot P1 where the distance from the vehicle C1 to the intersection A1 becomes equal to a distance T1 that is necessary for the vehicle C1 to carry out an economical deceleration operation on the way to the intersection A1. Then, the meter 240 executes deceleration guidance, the HV driving force control system 340 executes regeneration brake control, and the HV system control system 380 executes engine stop control. In the vehicle C1, deceleration operation is executed in accordance with the deceleration guidance conducted by the meter 240, and the regeneration brake control and the engine stop control are executed. Then, as shown in FIG. 6(*c*) as a first transition example L1, a gentle and economical deceleration operation is carried out from the spot P1 to the intersection A1. When it is determined that the reliability of running environment information that is newly acquired after the vehicle C1 passes through the intersection A1 is "middle" or "low," a driving assistance means is newly selected depending upon whether driving assistance in the vehicle C1 is driving assistance including the regeneration brake control and engine stop control or deceleration assistance including engine stop control only.

On the other hand, when driving assistance by the driving assistance device is not conducted as shown as a second transition example L2 in FIG. 6(*c*), the driver of the vehicle C1 starts the deceleration operation after the current state of the traffic signal AS is turned from green to yellow. Hence, the vehicle C1 starts deceleration at a spot P2, which is closer to the intersection A1 than the spot P1, and an abrupt deceleration operation, i.e., an uneconomical deceleration operation is carried out. In this embodiment, driving assistance is executed based on the determined running environment information, and fuel economy is improved by an amount corresponding to a difference S12 between the first transition example L1 and the second transition example L2.

As described above, according to the driving assistance device of the present embodiment, the following advantages are achieved.

(1) The reliability of running environment information acquired by the running environment information-acquiring unit 100 is determined by the first reliability determining unit 210, the second reliability determining unit 310 and the third reliability determining unit 350. In accordance with the determined reliability of the running environment information, a driving assistance means that can be set at that time is selected based on fuel economy. According to this, even if the reliability of running environment information is low, driving assistance suitable for the reliability is executed, and driving assistance capable of improving fuel economy can be executed. When the reliability of running environment information is low, economical driving assistance is carried out within a range in which a driver cannot easily perceive the driving assistance and as a result, it is possible to improve the fuel economy without giving a feeling of strangeness to the driver. According to this, it is possible to improve the fuel economy through setting of the driving assistance means which is suitable for running environment information of a vehicle while suppressing, to the minimum, a feeling of strangeness of the driver with respect to driving assistance.

(2) Setting of the driving assistance means is carried out as setting of a combined utilization mode of a plurality of driving assistance means that is implemented by combination of the meter 240, the HV driving force control system 340 and the HV system control system 380. According to this, more detailed and flexible driving assistance is implemented utilizing the meter 240, the HV driving force control system 340 and the HV system control system 380.

(3) As a driving assistance means to be combined, one or more driving assistance means capable of achieving the highest fuel economy at the time is selected. According to this, when driving assistance in which a plurality of driving assistance means are combined is carried out, realization of the highest fuel economy is promoted each time, and significantly economical driving assistance is carried out.

(4) As the driving assistance, deceleration assistance up to a stop position of a vehicle is carried out, and the reliability of the acquired running environment information is determined as the reliability of information concerning the distance to a deceleration/stop position of the vehicle. As the determined reliability of the running environment information becomes lower, a driving assistance means having smaller variation in vehicle behavior is selected. Hence, if the reliability of the running environment information is lowered, a driving assistance means that is not easily perceived by the driver whose driving is to be assisted is selected. Hence, even if the reliability of running environment information is lowered, economical driving assistance is continued within a range in which the driver cannot easily perceive the driving assistance, and economical driving assistance is ensured irrespective of the reliability of running environment information.

(5) The reliability of the running environment information is determined and classified into "high," "middle," and "low," and in accordance with the determined reliability, driving assistance through application of a brake force to the meter 240 as a display device and the drive train of the vehicle, and driving assistance through the non-drive train of the vehicle are executed. Hence, driving assistance that is easily perceived by the driver and driving assistance that is hardly perceived by the driver are previously prescribed based on empirical principles, and it becomes possible to carry out driving assistance using running environment information having reliability suitable for the prescribed driving assistance item. According to this, it becomes possible to reliably and easily select driving assistance suitable for running environment information acquired by the running environment information-acquiring unit 100.

(6) Setting of the driving assistance means is set as a combined utilization mode conducted by a plurality of driving assistance means, and a driving assistance means is selected such that the higher the determined reliability of running environment information, the greater the number of driving assistance means that are simultaneously used in combination becomes. Hence, as the reliability of running environment information becomes higher, the number of driving assistance means gradually increases, and the degree of influence on a vehicle operation by driving assistance increases. According to this, as the reliability of running environment information becomes higher, more effective driving assistance suitable for the reliability is carried out. According to this, it is possible to easily select a driving assistance means in accordance with the reliability of running environment, and realization of the highest fuel economy at the time is promoted.

(7) The running environment information is acquired by the ITS control device 110, the DSS control device 120 and the NAVI control device 130, and the reliability of the running environment information acquired from these devices 110 to 130 is determined based on the information identified by the devices 110 to 130. According to this, by identifying an information source of the running environment information, it becomes possible to determine the reliability of the running environment information, and it becomes possible to easily determine the reliability of the running environment information. The driving assistance is carried out while combining, as necessary, driving assistance means such as the meter 240, the HV driving force control system 340 and the HV system control system 380 in accordance with the determined running environment information. According to this, even if the reliability of running environment information is lowered, it is possible to carry out driving assistance that improves fuel economy within a range in which the driver cannot easily perceive the driving assistance by utilizing characteristics of a hybrid automobile.

(8) As driving assistance devices, the first reliability determining unit 210, the second mediating unit 320, and the third mediating unit 360 are provided. When the levels of the determined reliability of running environment information sets are the same, the shortest one of a plurality of distances that are assumed as the distance from the device-mounting vehicle to a deceleration/stop position of the vehicle is mediated as a distance through which driving assistance is carried out. Hence, when a plurality of information sets concerning the distance from the device-mounting vehicle to a specific intersection exist and the levels of the reliability of these information sets are the same for example, one of running environment information sets is uniformly selected. According to this, when running environment information is acquired using a plurality of systems such as the ITS control device 110, the DSS control device 120, and the NAVI control device 130, it is possible to easily select one of information sets that should be employed in driving assistance. At the time of mediation, the shortest one of a plurality of distances is mediated as a distance to be employed in the driving assistance. Therefore, when the levels of the reliability of running environment information sets are the same, driving assistance of giving priority to safety is carried out by setting a deceleration/stop position to a value closer to the device-mounting vehicle.

(9) The first reliability determining unit 210, the second reliability determining unit 310, and the third reliability determining unit 350 are provided in the communication path through which running environment information is transmitted between the running environment information-acquiring unit 100, the meter 240, the HV driving force control system 340, and the HV system control system 380, which are driving assistance means. Only running environment information determined as having reliability meeting the reliability criterion, which is set in the meter 240, the HV driving force control system 340 and the HV system control system 380 by the filter units 212, 312 and 352 provided in the reliability determining units 210, 310 and 350 is allowed to pass. Hence, it is only necessary for the meter 240, the HV driving force control system 340 and the HV system control system 380 to execute the driving assistance based on running environment information that is input through the reliability determining unit 210, 310 and 350. According to this, it is possible to smoothly set a driving assistance means in accordance with the reliability of running environment information.

(10) The reliability determining units 210, 310 and 350 as determining means are provided with the tables 211, 311 and 351, and the reliability of running environment information is determined by referring to the reliability criterion registered in the tables 211, 311 and 351. According to this, it is possible to uniformly determine the reliability of running environment information, and it is possible to easily determine the reliability of running environment information.

Second Embodiment

A driving assistance device according to a second embodiment of the invention will be described with reference to FIGS. 7 and 8. In the second embodiment, the driving assistance device is applied to an automobile in which only its engine is a power source, and its basic configuration is the same as that of the first embodiment.

FIG. 7 corresponds to FIG. 1, and shows an outline configuration of the driving assistance device of the second embodiment. In FIG. 7, the same reference numerals are given to those components that are the same as the corresponding components shown in FIG. 1 and detailed explanations are omitted.

That is, the driving assistance device of the second embodiment includes an AT control unit 400 instead of the hybrid control unit 300. The AT control unit 400 includes a fourth reliability determining unit 410 and a fourth mediating unit 420 having functions corresponding to the first reliability determining unit 210 and the first mediating unit 220. The fourth reliability determining unit 410 and the fourth mediating unit 420 are provided in a communication path through which the running environment information is transmitted. Among them, the fourth reliability determining unit 410 also includes a fourth filter unit 412 and a fourth table 411 corresponding to the first table 211.

The fourth filter unit 412 allows passage of running environment information determined as having "high" or "middle" reliability and inhibits passage of running environment information determined as having "low" reliability based on the reliability criterion shown in FIG. 8 as running environment information employed in driving assistance through a drive train of device-mounting vehicle. In this manner, running environment information that has passed through the fourth filter unit 412 is mediated by the fourth mediating unit 420, and the mediated running environment information is sent to a speed-shifting control amount calculating unit 430, which calculates a control amount of an automatic transmission system (AT system) 440.

The speed-shifting control amount calculating unit 430 calculates, based on the running environment information, a control amount for carrying out deceleration assistance when the accelerator is released. For example, the speed-shifting control amount calculating unit 430 determines a transmission gear ratio required for carrying out an economical and smooth stopping operation until the device-mounting vehicle reaches a stop position. That is, in a normal AT system, the transmission gear ratio is determined by the accelerator position angle and the vehicle speed. In such an AT system, a smooth accelerating operation is realized when the driver conducts the accelerating operation by shifting down the gear ratio as the vehicle speed is lowered when a vehicle is decelerated. According to the second embodiment on the other hand, if it is predicted that the device-mounting vehicle is approaching a stop position or a deceleration position based on the running environment information when the driver releases the accelerator, a driving assistance means is selected that frequently uses a fuel cut-off region utilizing a relatively high gear ratio without carrying out normal shift down. The control amount executing the driving assistance means is determined by the speed-shifting control amount calculating unit 430 based on the running environment information. Then, the determined control amount is sent to the AT system 440, and the AT system 440 carries out deceleration assistance suitable for the control amount.

Only when running environment information determined as having "high" or "middle" reliability is acquired by the running environment information-acquiring unit 100, a control amount from the speed-shifting control amount calculating unit 430 is input to the AT system 440. Deceleration assistance suitable for the control amount is executed by the AT system 440. Hence, in the second embodiment also, when the reliability of the running environment information that is input to the fourth reliability determining unit 410 of the AT control unit 400 is lowered from "high" or "middle" to "low", the AT system 440 does not carry out the deceleration assistance.

When the reliability of running environment information that is input to the fourth reliability determining unit 410 of the AT control unit 400 is improved from "low" to "middle" or "high", deceleration assistance is resumed by the AT system 440, and a driving assistance means including deceleration assistance conducted by the AT system 440 is selected.

In the second embodiment also, when the reliability of running environment information that is input to the fourth reliability determining unit 410 is improved from "low" or "middle" to "high," driving assistance utilizing a plurality of driving assistance means in combination implemented by the HV driving force control system 340 and the HMI 200 (meter 240) is carried out. According to this, when it is determined that running environment information is high, more effective driving assistance is carried out, and economical driving assistance is implemented.

As described above, according to the driving assistance device of the second embodiment, the advantages (1) to (6) and (8) to (10) are achieved, and the following advantage is achieved instead of the advantage (7).

(7A) In accordance with the determined running environment information, the meter 240 and the driving assistance means of the AT system 440 are combined as necessary and the driving assistance is carried out. According to this, in a vehicle in which only its engine is a power source, even if the reliability of running environment information is lowered, it is possible to carry out driving assistance that improves fuel economy within a range in which the driver cannot easily perceive the driving assistance by utilizing characteristics of the AT system 440.

The above-described embodiments may also be carried out in the following modes.

In each of the embodiments, the reliability determining units 210, 310, 350 and 410 include the filter units 212, 312, 352 and 412. Alternatively, the filter units 212, 312, 352 and 412 of the reliability determining units 210, 310, 350 and 410 may be omitted, and the filter units 212, 312, 352 and 412 may be provided in the mediating units 220, 320, 360 and 420. In this case, only the reliability of running environment information is determined in each of the reliability determining units 210, 310, 350 and 410, and mediation suitable for the reliability of running environment information is carried out by the mediating units 220, 320, 360 and 420. According to this configuration also, advantages corresponding to the advantages (1) to (10) and (7A) can be achieved.

In each of the embodiments, only when information indicated in running environment information is obviously an abnormal value, that running environment information is interrupted by the third filter unit 352 and other running environment information is allowed to pass. The invention is not limited to this, and even if it is predicted that information indicated in running environment information is obviously an abnormal value, the reliability of the information is determined as "low" and the information can be used for the driving assistance.

In the first embodiment, the engine stop control when the reliability of running environment information is determined as "low" is executed as driving assistance through the non-driving force control. The invention is not limited to this, and as driving assistance when the reliability of running environment information is lowered, it is also possible to change a target charge amount (SOC: State of charge) of a battery provided in a hybrid automobile, for example. In this case, when the reliability of running environment information is lowered for example, vehicle control for improving the charging rate of the battery is carried out by improving the target charge amount of the battery. Since such vehicle control cannot easily be perceived by the driver, driving assistance suitable for the reliability of running environment information is carried out. The battery is a portion of the non-drive train of the vehicle, and change in the target charge amount of the battery corresponds to static control of the non-drive train of the vehicle. When it is determined that the reliability of running environment information is "low", it is also possible to execute driving assistance in which engine stop control and the target charge amount of the battery are combined. In this case, more economical driving assistance is executed within a range in which the driver cannot easily perceive the driving assistance.

In each of the embodiments, the learning database 135 is provided in a vehicle to be driving-assisted. The invention is not limited to this, the learning database may be provided in a management center such as a probe information center and a road traffic information center, which collects, outside a vehicle, vehicle information and traffic information, and a learning operation may be carried out through communication between the management center and the vehicle to be driving-assisted. When driving assistance is carried out, the driving assistance device acquires information concerning a learned value that is learned in the learning database and the number of times of learning of the learned value through the communication between the management center and the vehicle to be driving-assisted, and the reliability may be determined and driving assistance may be executed based on the acquired information. In this case, information learned by the learning database may be information based on a vehicle operation of one driver or may be information based on vehicle operations of plurality of drivers.

In each of the embodiment, running environment information of the device-mounting vehicle is acquired by the ITS control device 110, the DSS control device 120 and the NAVI control device 130. The invention is not limited to this, and running environment information of the device-mounting vehicle may be acquired by various devices such as a vehicle-mounted camera. In short, if it is possible to acquire running environment information around the device-mounting vehicle, any device can be used.

In each of the embodiments, the reliability determining units 210, 310, 350 and 410 include the tables 211, 311, 351 and 411. The invention is not limited to this, the tables 211, 311, 351 and 411 in the reliability determining units 210, 310, 350 and 410 may be omitted, and the reliability of running environment information may be determined by a program using conditionals or the like.

In the first embodiment, the meter 240, the HV driving force control system 340, and the HV system control system 380, which form the driving assistance means, are respectively provided with the first reliability determining unit 210, the second reliability determining unit 310 and the third reliability determining unit 350 for determining the reliability of running environment information utilized by these systems.

Figure 9:
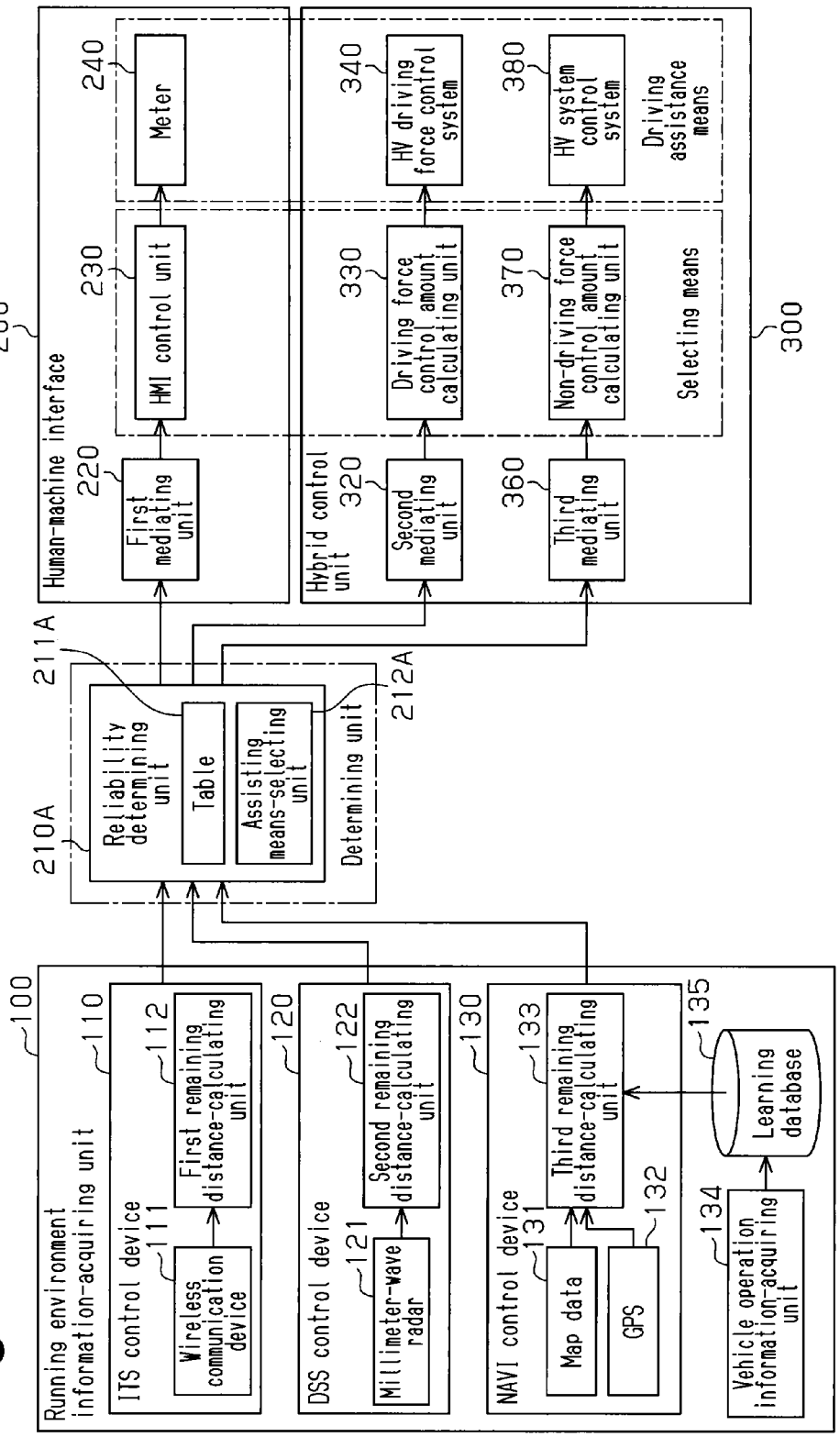
FIG. 9 is a schematic block diagram of another embodiment of the driving assistance device of the invention.

In the second embodiment, the meter 240 and the AT system 440, which form the driving assistance means, are respectively provided with the first reliability determining unit 210 and the fourth reliability determining unit 410 for determining the reliability of running environment information utilized by these systems. The invention is not limited to this, and as shown in FIG. 9, which corresponds to FIG. 1, for example, one reliability determining unit 210A may be provided in a communication path between the running environment information-acquiring unit 100, the HMI 200 and the hybrid control unit 300. In this case, the reliability determining unit 210A includes a table 211A, in which the reliability criterion is registered, and an assisting means-selecting unit 212A, which selects a sending destination of running environment information in accordance with the reliability of the running environment information, and selects a utilization mode of a driving assistance means. If the reliability determining unit 210A determines that the reliability of running environment information acquired from the running environment information-acquiring unit 100 is "high," the reliability determining unit 210A selects all of the meter 240, the HV driving force control system 340 and the HV system control system 380 as driving assistance means to be utilized, and sends the running environment information to the first mediating unit 220, the second mediating unit 320 and the third mediating unit 360. Similarly, if the reliability determining unit 210A determines that the reliability of running environment information acquired from the running environment information-acquiring unit 100 is "middle", the reliability determining unit 210A selects the HV driving force control system 340 and the HV system control system 380 as driving assistance means to be utilized, and sends the running environment information to the second mediating unit 320 and the third mediating unit 360. Similarly, if the reliability determining unit 210A determines that the reliability of running environment information acquired from the running environment information-acquiring unit 100 is "low," the reliability determining unit 210A selects only the HV system control system 380 as a driving assistance means to be utilized, and sends the running environment information to the third mediating unit 360. According to this configuration as the driving assistance device, it is possible to utilize a driving assistance means suitable for the reliability of running environment information only by providing a path through which running environment information sets are collectively transmitted with one reliability determining unit 210A. According to this, it is possible to select the driving assistance means with a simpler configuration. In addition, it is only necessary that the reliability determining means determines the reliability of the acquired running environment information.

If there are pluralities of information sets concerning the distance to one deceleration/stop position when levels of the reliability of running environment information sets are the same, the mediating units 220, 320, 360, and 420 mediate the shortest one of the distances as a distance through which driving assistance is carried out. The invention is not limited to this, and if there are a plurality of information sets concerning the distance to one deceleration/stop position when levels of the reliability of running environment information sets are the same, the longest one of the distances, an intermediate distance or any distance may be mediated as a distance through which driving assistance is carried out. In addition, when driving assistance is carried out using running environment information of which the reliability is determined, the mediating units 220, 320, 360, and 420 may be omitted.

Figure 10:
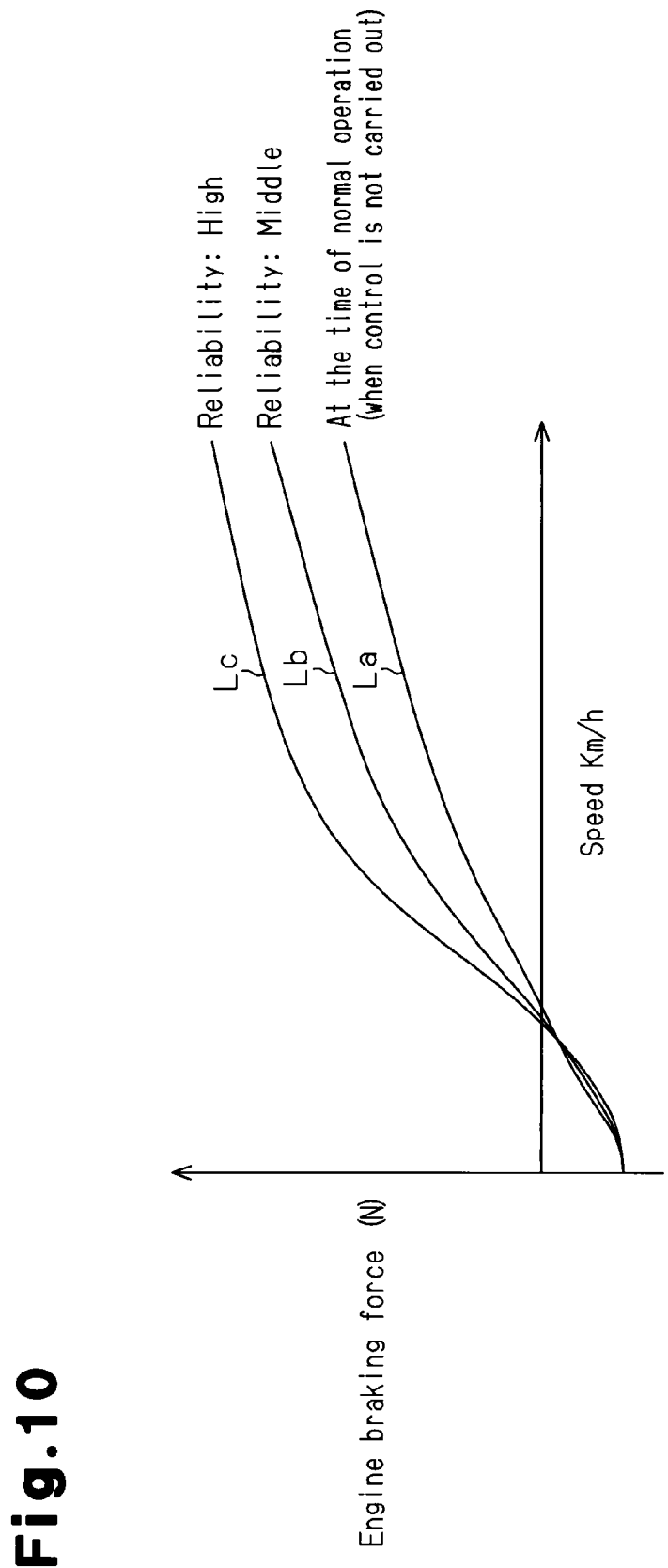
FIG. 10 is a graph showing an example changes in engine braking force as a control amount of another embodiment of the driving assistance device of the invention.

When the reliability of running environment information determined by the second reliability determining unit 310 is "middle", deceleration assistance is carried out by the HV driving force control system 340 of the hybrid control unit 300. Concerning deceleration control conducted by the HV driving force control system 340 when accelerator is released, a control amount may be varied in accordance with the number of times of learning by the learning database 135 within a range in which the reliability is determined as "middle." It is possible to employ such a configuration in which as the number of times of learning by the learning database 135 increases, a deceleration force by the HV driving force control system 340 is increased. In this case, as shown in FIG. 10 for example, if transition of a normal engine braking force is a first transition example La, as the determined reliability of running environment information is improved, the engine braking force is increased in forms of a second transition example Lb and a third transition example Lc. According to this, a control amount corresponding to the number of times of learning of the driver's vehicle operation is set, and more detailed driving assistance is carried out within a range where the reliability of the running environment information is determined as "middle."

In each of the embodiments, it is determined that the reliability of running environment information acquired by the ITS control device 110 or the DSS control device 120 is "high." As the number of times of learning of running environment information sets conducted by the learning database 135 increases, the levels of the reliability of running environment information sets are sequentially determined as "low," "middle" and "high." The invention is not limited to this, the reliability of running environment information can be set based on characteristics and specification of each of the systems that acquire running environment information, and any reliability can be prescribed for every information source of running environment information. In addition, it is also possible to employ such that resolving power of running environment information is discriminated, and as the discriminated resolving power is higher, the reliability of the running environment information is determined as "high".

In the first embodiment, when the reliability of running environment information is determined as "low," driving assistance of only engine stop control before the accelerator is released is executed by the hybrid control unit 300. When the reliability is determined as "middle," driving assistance to which deceleration control when the accelerator is released is added is executed by the hybrid control unit 300. When the reliability is determined as "high," driving assistance to which the HMI 200 is further added is executed. The invention is not limited to this, when the reliability is determined as "high," driving assistance of only the HMI 200 may be executed, and when the reliability is determined as "middle," only the deceleration control when the accelerator is released may be executed by the hybrid control unit 300. In the second embodiment, when the reliability of the running environment information is determined as "low," driving assistance is not executed, and when the reliability is determined as "middle," driving assistance to which speed-shifting control of a gear ratio by the AT system 440 is added is executed by the AT control unit 400. When the reliability is determined as "high," driving assistance to which the HMI 200 is further added is executed. In short, it is only necessary that as the reliability of running environment information is lowered, driving assistance using a driving assistance means that is not easily perceived by the driver is carried out, and a utilization mode of the driving assistance means is not limited. In addition, the driving assistance means can be realized by means capable of setting an arbitrary item for assisting a driver's driving operation of vehicle, and if means can improve fuel economy, this means can be used as the driving assistance means.

In each of the embodiments, when the reliability of running environment information is "high," an image is output through the meter 240 provided in a vehicle as driving assistance. The invention is not limited to this, a sound device may be provided as the driving assistance device, and driving assistance may be executed by outputting sound through the sound device provided in the vehicle in addition to the image output. Instead of the image output, driving assistance may be executed as sound output.

In each of the embodiments, when the reliability of running environment information is "high," an image is output through the meter 240 as driving assistance, and when reliability is "middle," driving assistance through driving force control is executed as the driving assistance. In the first embodiment, when reliability is "low," driving assistance through non-driving force control is executed as driving assistance. The invention is not limited to this, it is only necessary that as the running environment information is lowered, driving assistance that is not easily perceived by a driver who is driving-assisted is executed, and reliability criterion of each of the driving assistance means can freely be set. Further, the reliability criterion can be set for each of the driving assistance means by a driver who is driving-assisted for example, and driving assistance corresponding to the reliability criterion that is set by the driver can be executed. That is, depending upon drivers, there is a case where driving assistance through driving force control can easily be perceived as compared with image guidance or sound guidance. Therefore, according to this configuration, it is possible to carry out driving assistance that does not give a feeling of strangeness to the driver.

In each of the embodiments, the reliability of running environment information acquired by the running environment information-acquiring unit 100 is determined and classified into three stages, i.e., "high," "middle," and "low". The invention is not limited to this, and it is of course possible to determine the reliability and classify the reliability into two stages, i.e., "high" and "low," and to carry out driving assistance in accordance with the determined reliability. In this case, it is only necessary to determine the reliability of running environment information and classify the reliability into two stages, and it is possible to more easily discriminate running environment information. Similarly, it is also possible to determine and classify reliability into four stages, and to carry out driving assistance corresponding to the determined reliability. In this case, more detailed driving assistance can be set.

In each of the embodiments, as the determined reliability of running environment information becomes lower; a driving assistance means having smaller variation in vehicle behavior is selected. The invention is not limited to this, and when the reliability of running environment information is determined and driving assistance suitable for the determined running environment information is carried out, it is possible to employ such a configuration that as the reliability becomes higher, a driving assistance means having smaller variation in vehicle behavior is selected.

In each of the embodiments, deceleration assistance up to a stop position of a vehicle is carried out as driving assistance, and the reliability of the running environment information is determined as the reliability of information concerning the distance up to a deceleration/stop position of a vehicle. The invention is not limited to this, and as driving assistance, it is of course possible to execute adaptive cruise control based on information concerning an inter-vehicular distance from a vehicle in front acquired by the DSS control device 120. In addition, as the driving assistance, driving assistance that improves economy based on running environment information around the device-mounting vehicle may be carried out.

Setting of the driving assistance means is set as transition of the combined utilization mode of a plurality of driving assistance means. The invention is not limited to this, and setting of the driving assistance means may be set as transition of a utilization mode of a single driving assistance means. In this case, as shown in FIG. 10 for example, it is possible to employ such a configuration that the driving assistance is carried out as application of a brake force of a drive train of a vehicle, and as the reliability of running environment information becomes higher, a control amount is increased in the forms of the first transition example La, the second transition example Lb and the third transition example Lc, and the driving assistance means is selected. According to this, it is possible to carry out driving assistance suitable for the reliability of running environment information utilizing one means, i.e., the drive train of a vehicle.

As a driving assistance means to be combined, one or more driving assistance means capable of achieving the highest fuel economy at the time are selected. The invention is not limited to this, and a driving assistance means to be combined may be set based on fuel economy.

DESCRIPTION OF THE REFERENCE NUMERALS

100: Running Environment Information-Acquiring Unit,
110: ITS Control Device,
111: Wireless Communication Device,
112: First Remaining Distance-Calculating Unit,
120: DSS Control Device,
121: Millimeter-Wave Radar,
122: Second Remaining Distance-Calculating Unit,
130: NAVI Control Device,
131: Map Data,
132: GPS,
133: Third Remaining Distance-Calculating Unit,
134: Vehicle Operation Information-Acquiring Unit,
135: Learning Database,
200: HMI (Human-Machine Interface),
210: First Reliability Determining unit,
210A: Reliability Determining unit,
211: First Table,
211A: Table,
212: First Filter Unit,
212A: Assisting Means-Selecting Unit,
220: First mediating Unit,
230: HMI Control Unit,
240: Meter,
300: Hybrid Control Unit,
310: Second Reliability Determining unit,
311: Second Table,
312: Second Filter Unit,
320: Second mediating Unit,
330: Driving Force Control Amount Calculating Unit,
340: HV Driving Force Control System,
350: Reliability Determining unit,
350: Third Reliability Determining unit,
351: Third Table,
352: Third Filter Unit,
360: Third mediating Unit,
370: Non-Driving Force Control Amount Calculating Unit,
380: HV System Control System, 400: AT Control Unit,
410: Fourth Reliability Determining unit,
411: Fourth Table,
412: Fourth Filter Unit,
420: Fourth mediating Unit,
430: Speed-Shifting Control Amount Calculating Unit,
440: AT System (Automatic Transmission System),
A1: Intersection,
AS: Traffic Signal,
BC: Optical Beacon Antenna,
C1: Vehicle.

The invention claimed is:

1. A driving assistance device, which acquires running environment information of a vehicle, sets one or more devices selected from a group of a display device, a sound device, a deceleration controller and an engine stop controller, suitable for the running environment information, and assists a driving operation of the vehicle by combining a combination from the set one or more devices of the group, the driving assistance device comprising a processor configured to:
   determine reliability of the acquired running environment information; and
   select one of the devices of the group based on fuel economy in accordance with the determined reliability of the running environment information,
   wherein, as the determined reliability of the running environment information becomes higher, the processor selects at least one of the display device and the sound device,
   wherein, as the determined reliability of the running environment information becomes lower, the processor does not select the display device and the sound device, but selects at least one of the deceleration controller and the engine stop controller.

2. The driving assistance device according to claim 1, wherein the processor selects one or more devices of the group capable of achieving the highest fuel economy as the device of the group to be combined.

3. The driving assistance device according to claim 1, wherein
   the driving assistance is deceleration assistance up to a stop position of the vehicle,
   the processor determines the reliability of the acquired running environment information as reliability of information concerning a distance up to a deceleration position or a stop position of the vehicle, and
   as the determined reliability of the running environment information becomes lower, the processor selects the device of the group causing smaller variation in vehicle behavior.

4. The driving assistance device according to claim 1, wherein
   the processor determines the reliability of the acquired running environment information and classifies the reliability into three stages, i.e., "high," "middle," and "low,"
   when the determined reliability is "high," the processor executes, as the driving assistance, driving assistance by outputting an image or sound through a display device or a sound device mounted in the vehicle,
   when the determined reliability is "middle," the processor executes, as the driving assistance, driving assistance through driving force control, which is dynamic control of a drive train of the vehicle, and
   when the determined reliability is "low," the processor executes, as the driving assistance, driving assistance through non-driving force control, which is static control of the drive train or a non-drive train of the vehicle.

5. The driving assistance device according to claim 3, wherein, as the determined reliability of running environment information becomes higher, the processor selects a greater number of simultaneously employed devices of the group that are combined.

6. A driving assistance device, which acquires running environment information of a vehicle, sets one or more devices selected from a group, suitable for the running environment information, and assists a driving operation of the vehicle by combining a combination from the set one or more devices of the group, the driving assistance device comprising a processor configured to:
   determine reliability of the acquired running environment information; and
   select one of the devices of the group based on fuel economy in accordance with the determined reliability of the running environment information, wherein
   the driving assistance is deceleration assistance up to a stop position of the vehicle,
   the vehicle is a hybrid vehicle,
   the running environment information includes information of a distance estimated until the vehicle stops after the deceleration assistance is started, which distance information is calculated from: information concerning a display switching cycle of a traffic signal acquired by an intelligent transport system (ITS) and concerning a distance to the traffic signal; information concerning a position of a vehicle in front acquired from a millimeter-wave radar system; and information concerning a distance to a deceleration position or a stop position acquired from a navigation system,
   the group includes a human-machine interface (HMI), which induces an accelerator-releasing operation by display of a meter, deceleration control conducted by a hybrid control unit when the accelerator is released, and engine stop control conducted by the hybrid control unit before the accelerator is released,
   on condition that the information concerning the display switching cycle of the traffic signal and concerning the distance to the traffic signal have been acquired from the intelligent transport system (ITS) or that the information concerning the position of the vehicle in front has been acquired from the millimeter-wave radar system, the processor determines the reliability of the running environment information as "high," and with respect to information concerning the distance to the deceleration position or the stop position acquired from the navigation system, the processor repeatedly executes a learning operation of the information, and as the number of times of is increased, the processor changes the determination of the reliability of the running environment information from "low," to "middle," to "high" sequentially,
   when the determined reliability of the running environment information is determined as "low," the processor executes, among the devices of the group, driving assistance of only engine stop control conducted by the hybrid control unit before the accelerator is released,
   when the determined reliability of the running environment information is determined as "middle," the processor executes driving assistance including deceleration control conducted by the hybrid control unit when the accelerator is released among the devices of the group, and
   when the determined reliability of the running environment information is determined as "high," the processor executes driving assistance further including the human-machine interface (HMI) inducing the accelerator-releasing operation by the meter display among the devices of the group.

7. The driving assistance device according to claim 6, wherein concerning deceleration control conducted by the hybrid control unit when the accelerator is released when the reliability of running environment information determined by the processor is "middle," a control amount of the deceleration control is varied in accordance with the number of times of the learning within a range in which the reliability is determined as "middle."

8. The driving assistance device according to claim 4, further comprising a mediating unit, wherein the mediating unit mediates, as a distance through which driving assistance is carried out, shortest one of a plurality of distances to a deceleration position or a stop position of the vehicle when the level of the reliability of the running environment information by the processor is the same.

9. The driving assistance device according to claim 1, wherein
the processor is provided in each of communication paths through which the running environment information is transmitted between the devices of the group and a system that acquires the running environment information,
the processor has a filtering function that allows passage of running environment information determined as having reliability satisfying a reliability criterion that is set for the corresponding devices of the group, and inhibits transmission of running environment information that is determined as having reliability lower than the reliability criterion.

10. The driving assistance device according to claim 1, wherein
the communication path through which the running environment information is transmitted between the devices of the group and a system that acquires the running environment information is unified in the processor, and
the processor selectively sends, to corresponding one of the devices of the group, running environment information determined as having reliability satisfying a reliability criterion prescribed in the corresponding devices of the group.

11. The driving assistance device according to claim 1, wherein the processor determines the reliability by referring to a table in which reliability sets are registered with respect to information sets concerning a distance to the deceleration position or the stop position of the vehicle acquired from each of the systems as the running environment information sets.

12. The driving assistance device according to claim 1, wherein
the driving assistance is carried out as application of a brake force to the drive train of the vehicle, and
the processor selects the device of the group such that the higher the reliability, the greater a control amount for determining the brake force becomes.

13. The driving assistance device according to claim 4, wherein, as the determined reliability of running environment information becomes higher, the processor selects a greater number of simultaneously employed devices of the group that are combined.

* * * * *